(12) United States Patent
Feldmann et al.

(10) Patent No.: US 7,933,752 B2
(45) Date of Patent: *Apr. 26, 2011

(54) METHOD, APPARATUS AND COMPUTER PROGRAM PROVIDING BROADBAND PRECONDITIONING BASED ON A REDUCED COUPLING FOR NUMERICAL SOLVERS

(75) Inventors: Peter Feldmann, New York, NY (US); Jason D. Morsey, Hopewell Junction, NY (US); Barry J. Rubin, Croton-on-Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 232 days.

This patent is subject to a terminal disclaimer.

(21) Appl. No.: 12/192,481

(22) Filed: Aug. 15, 2008

(65) Prior Publication Data

US 2008/0306716 A1    Dec. 11, 2008

Related U.S. Application Data

(63) Continuation of application No. 10/815,432, filed on Mar. 31, 2004, now Pat. No. 7,418,370.

(51) Int. Cl.
| | |
|---|---|
| G06F 7/60 | (2006.01) |
| G06G 7/48 | (2006.01) |
| G06G 7/50 | (2006.01) |
| G01V 1/40 | (2006.01) |
| G01F 1/00 | (2006.01) |
| G01F 17/00 | (2006.01) |
| G01R 15/00 | (2006.01) |

(52) U.S. Cl. ........... 703/2; 703/6; 703/7; 703/9; 702/12; 702/45; 702/48; 702/50; 702/57

(58) Field of Classification Search .................. 703/2, 6, 703/7, 9; 702/12, 45, 48, 50, 57
See application file for complete search history.

(56) References Cited

U.S. PATENT DOCUMENTS

| | | | | |
|---|---|---|---|---|
| 5,136,538 A | * | 8/1992 | Karmarkar et al. | 364/754 |
| 5,442,569 A | * | 8/1995 | Osano | 716/20 |

(Continued)

OTHER PUBLICATIONS

"Electrical Modeling of Extremely Large Packages", B.J. Rubin, et al., IEEE 1997, pp. 804-809.* Botta, E.F.F. et al., "How Fast the Laplace Equation Was Solved in 1995," Applied Numerical Mathematics, 1997 vol. 24, pp. 439-455.*
Gustafsson, I. "A Class of First Order Factorization Methods," BIT Numerical Mathematics, Jun. 1978, vol. 18, No. 2, pp. 142-156.*
Paolini, G.V. and Di Brazolo, G.R. "Data Structures to Vectorize CG Algorithms for General Sparsity Patterns," Dec. 1989, vol. 29, No. 4, pp. 703-718.*
Barrett, R. et al., Templates for the Solution of Linear System: Building Blocks for Iterative Methods, 1993, Chapter 3, pp. 35-49.*

*Primary Examiner* — Jason Proctor
*Assistant Examiner* — Nithya Janakiraman
(74) *Attorney, Agent, or Firm* — Harrington & Smith

(57) ABSTRACT

This invention relates to computing numerical solutions of linear systems of equations, specifically to implementing preconditioning of the coefficient matrix of such a system. The preconditioning applies to any coefficient matrix, dense or sparse, based on the solutions of a physical problem of unknown functions, commonly referred to as basis or interpolation functions, where the basis function spans more then one mesh element. Examples of such linear systems can result from, as examples, an electromagnetic analysis of printed circuit boards or field scattering in radar applications, fluid mechanics and acoustics. A method and system to compute a preconditioner for a coefficient matrix A that is compatible with the linear system of equations that provides basis function support over at least two mesh elements. Coupling of the preconditioner between partitions of a portioned mesh representation is only through basis functions at the partition boundaries.

24 Claims, 2 Drawing Sheets

U.S. PATENT DOCUMENTS

| | | | |
|---|---|---|---|
| 5,604,911 A * | 2/1997 | Ushiro | 703/2 |
| 5,729,451 A * | 3/1998 | Gibbs et al. | 702/12 |
| 5,754,181 A * | 5/1998 | Amdursky et al. | 345/419 |
| 6,064,808 A * | 5/2000 | Kapur et al. | 703/2 |
| 6,360,190 B1 * | 3/2002 | Kumashiro | 703/2 |
| 7,006,951 B2 * | 2/2006 | Pond et al. | 703/2 |
| 7,027,964 B2 * | 4/2006 | Kennon | 703/2 |
| 7,089,159 B2 * | 8/2006 | Hachiya | 703/2 |
| 2005/0222825 A1 * | 10/2005 | Feldmann et al. | 703/2 |
| 2006/0031794 A1 * | 2/2006 | Li et al. | 716/4 |
| 2006/0036418 A1 * | 2/2006 | Pita et al. | 703/10 |
| 2006/0122777 A1 * | 6/2006 | Patzek et al. | 702/6 |

* cited by examiner

METHOD, APPARATUS AND COMPUTER PROGRAM PROVIDING BROADBAND PRECONDITIONING BASED ON A REDUCED COUPLING FOR NUMERICAL SOLVERS

CROSS REFERENCE TO RELATED APPLICATIONS:

This patent application is a continuation of and claims priority from U.S. patent application Ser. No. 10/815,432, filed on Mar. 31, 2004 now U.S. Pat. No. 7,418,370, the disclosure of which is incorporated by reference herein in its entirety.

TECHNICAL FIELD

This invention relates to techniques and systems to compute numerical solutions of linear systems of equations, and more specifically relates to implementing preconditioning of the coefficient matrix of such a system.

BACKGROUND

Systems are known in the art for computing numerical solutions of linear systems of equations. Also known is the preconditioning of the coefficient matrix of such a system.

Computer aided design (CAD) systems have become accepted universally as important engineering design tools for a variety of applications in mechanical, civil, and electrical engineering. Information regarding the shape and physical properties of a device or structure are captured and stored in the system in the form of a geometric model. The behavior of the physical system is described in mathematical terms, via the application of known laws of physics, as a problem whose solution reveals a property of the system that it is desired to evaluate. In practice, a region is divided into elements, often tens of thousands or millions of elements, over which the properties are considered to vary in a known manner and to which classical principles can be applied to yield a system of linear algebraic equations.

The computational cost associated with evaluating the physical system is dominated by the solution of this system of equations. It is therefore of paramount technical importance to improve the computational efficiency with which the numerical solution to these equations can be generated. For this reason, iterative techniques are typically the method of choice for solving such linear systems due to their speed advantage over direct inversion methods. These methods, however, are strongly dependent of the condition number, i.e., the size of the span of the spectrum of the resulting matrix. It is known that large condition numbers reduce the convergence of the system dramatically.

In order to overcome the convergence rate difficulties, matrix preconditioners are used to reduce the condition number. Solving linear systems using conjugate gradient (CG) iterative methods, for example, with preconditioning has been well documented and is summarized in "*Numerical Recipes*", W. Press et al., Cambridge Press (1992). The most common preconditioning method is known as incomplete LU, and is described in detail in "*Iterative Solution Methods*", O. Axelsson, Cambridge Press (1994). To summarize, in a triangular (LU) factorization of a matrix A, the matrix is decomposed into a lower triangular matrix L and an upper triangular matrix U, thereby expressing the matrix as a product LU=A. If A is a sparse matrix, meaning the matrix has a low ratio of nonzero elements, the ratio of nonzero elements in the resulting matrices L and U is increased. The generation of nonzero elements is ordinarily called "fill-in". In the incomplete LU, the fill-in is ignored by approximating it to zero. Alternatively, fill-in can be selectively ignored based on its relative magnitude. Modifications to the incomplete LU in generating preconditioners for sparse coefficient matrices are described in U.S. Pat. No. 5,136,538, "Preconditioned Conjugate Gradient System", N. K. Karmardar et al., and in commonly assigned U.S. Pat. No. 5,754,181, "Computer Aided Design System", V. Amdursky et al.

The application of incomplete LU is limited to instances where the condition number is small, which is especially the case in the solution of dense matrices, such as those produced when attempting to solve integral equations. In order to apply an incomplete LU on a dense preconditioner, the preconditioner must first be "sparsed". For example, setting to zero all matrix elements whose magnitude is below a certain threshold, or setting to zero all elements in the preconditioner representing interactions between elements in the physical system separated by distances larger then a certain threshold. All known choices of sparsing the preconditioner, including the two mentioned above, when combined with incomplete, or even complete, LU factorization produce poor results difficulty in general linear systems with large conditioner numbers, a general and robust preconditioning method is needed. Prior to this invention, this need was not adequately met.

A particular problem arises during the electrical analysis of devices that are small with respect to the wavelength, such as electronic packaging structures, chips, interconnects, and printed circuit boards. The analysis of such structures results in linear systems of equations to be solved, which are desired to be solved iteratively by a fast, low storage requirement solver such as the Fast Multipole Method or the pre-corrected FFT method. The use of an iterative solver requires that the condition number of the linear system (the ratio of the largest to smallest eigenvalue) be as close to one as possible. When the condition number is too large a preconditioner is used to condition the system and reduce the condition number. However, for such structures as those mentioned above, the use of common rooftop basis functions (also known as Rao-Wilton Glisson or RWG functions) produces linear systems with large condition numbers such that no known preconditoner has been available to properly condition the system.

As was noted above, the most common attempt at a preconditioner is one based on geometrically close interactions. To form such a preconditioner, one sets to zero all interactions in the linear system that are geometrically separated by a defined distance. Such a preconditioner will only be effective, however, for structures that are large compared to the wavelength when the common rooftop or RWG basis functions are used. One existing solution to this problem uses less desirable loop-tree or loop-star basis functions which result in a better conditioned linear system. A disadvantage of this approach, however, is that the fast solvers mentioned above have difficulties dealing with the often large loops produced by the change in the basis functions. This is due to the inaccurate calculation of near interactions by the fast solver, for which large loops have many. Reference can be made to "Fast and efficient algorithms in electromagnetics", by Weng Chew et al., Artech House 2001, for descriptions of fast solvers and loop-tree or loop-star basis functions.

SUMMARY OF THE PREFERRED EMBODIMENTS

The foregoing and other problems are overcome, and other advantages are realized, in accordance with the presently preferred embodiments of these teachings.

Disclosed is a preconditioning method for the solution of linear systems based on physical systems, where unknown basis functions are supported by at least two mesh elements. To generate the preconditioner, the physical system is partitioned into regions with a small number of unknown elements per region. The preconditioner is represented by those elements of the linear system's coefficient matrix representing interactions between physical elements in the same regions only.

To avoid the use of any form of incomplete LU, which produces inadequate results, a specialized method of applying the preconditioner is also disclosed. The preconditioning technique can be applied to any iterative solver, such as conjugate gradient (CG) or the method of geometric residuals (GemRes) and to any type of numerical solver, such as the method of moments (MoM) or the finite element method (FEM). The preconditioning technique effectively lowers the condition number of ill conditioned linear systems previously thought to be unsolvable in their native form due to their large condition number.

Disclosed is a method, a computer program and a system to partition the mesh of a physical system into regions to produce a preconditioner compatible with linear systems of equations having basis/interpolation function support over at least two mesh elements. Coupling of the preconditioner between regions or partitions is only through the basis functions on the partition boundaries, which produces a preconditioner that is itself a valid solution to the same set of physical equations governing the full linear system. In this way the preconditioner is ideally suited for application to systems with poor condition numbers.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The preconditioning operation in accordance with this invention applies to any coefficient matrix, dense or sparse, based on the solutions of a physical problem of unknown functions, commonly referred to as basis or interpolation functions, where the basis function spans more then one mesh element. Examples of such linear systems may result from, but are not restricted to, an electromagnetic analysis of printed circuit boards or field scattering in radar applications, fluid mechanics and acoustics using solution techniques such as the method of moments (MoM) or the finite element method (FEEM). References for both methods can be found in R. Harrington's *Field Computation by Moment Method*, Krieger Publishing (1968) and J. Jin's *The Finite Element Method in Electromagnetics*, John Wiley & Sons Inc. (2002), respectively.

Figure 1:
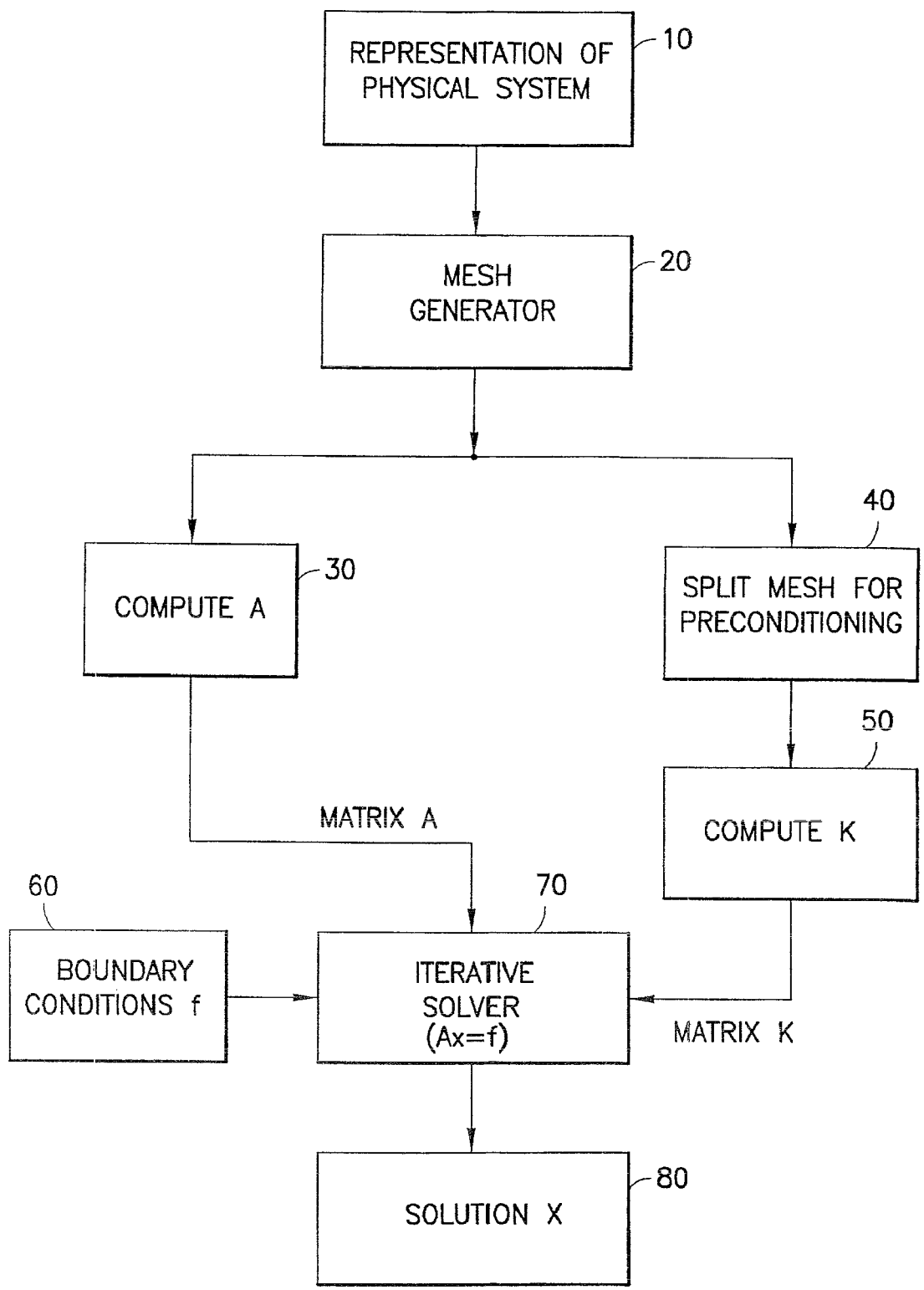
FIG. 1 is a schematic drawing of a method to provide the solution of a physical system.

FIG. 1 shows various operations for solving a linear system of equations based on the presently preferred method of preconditioning, that in turn is based on reduced coupling. FIG. 1 may also be viewed as representing a block diagram of a computational system that generates and uses the preconditioner in accordance with this invention. FIG. 1 may also be viewed as a logic flow diagram that illustrates the operation of a computer program having program instructions that are executable by at least one digital processing apparatus, and that is stored in a machine-readable medium, such as in memory chips, a disk, a tape, or any suitable computer program instruction storage media.

A presently preferred, but not exclusive, method of reduced coupling is described by B. Rubin et al. in "Electrical modeling of extremely large packages", Proceedings of Electronic Components and Technology Conference, 1997, the content of which is incorporated by reference herein.

In accordance with an aspect of this invention the reduced coupling is applied as a preconditioner to solve linear systems, and in accordance with a further aspect of the invention the preconditioner may be applied to a wider range of problem types than conventional approaches.

In the method of FIG. 1 a description 10 of a physical structure of interest is divided by a mesh generator 20 into smaller elements, potentially numbering anywhere from thousands to millions. The union of these elements is commonly referred to as the "mesh" (see FIG. 2). In the MoM approach, commonly used to solve integral equations, unknown vector functions are described by mathematically known functions called basis functions that are supported over adjacent mesh elements. In the FEM approach, commonly used to solve differential equations, basis functions are associated with the mesh vertices and are defined over all mesh elements using that vertex. The mesh is used to compute the matrix A of coefficients for the linear system in block 30 by computing the interaction between the simple functions defined over all of these sets of mesh elements.

Figure 2:
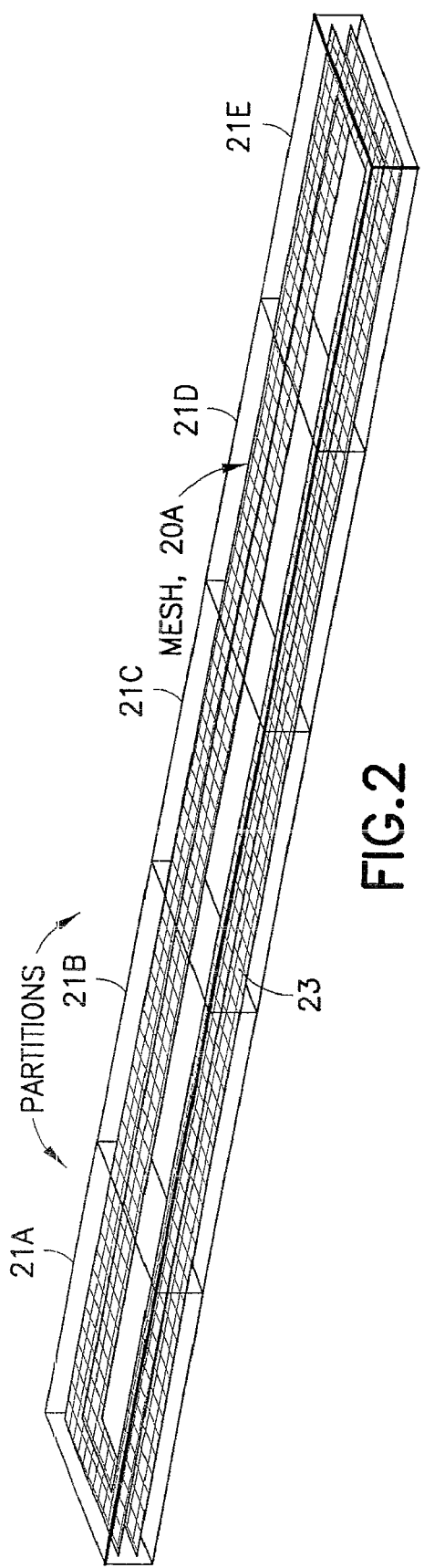
FIG. 2 is a depiction of the splitting of a mesh into regions or partitions for preconditioning.

A preconditioning matrix K is computed by first splitting or partitioning the mesh 20A that is output from mesh generator 20 into independent regions using mesh splitting function 40, with each region or partition containing many elements. FIG. 2 depicts an example of a physical mesh 20A split into five distinct partitions 21A, 21B, 21C, 21D and 21E, collectively referred to as partitions 21. The partition boundaries are constrained to coincide with the edges of mesh elements. In other words, the mesh elements may start and end on the partition boundaries but may not cross the boundaries.

The preconditioner is implemented in block 50 by computing mesh element interactions using reduced coupling. The interactions between basis functions are computed only for those "half" functions within the same preconditioning partition 21. Here a "half" denotes the function over any one of the multiple mesh elements for which it is defined. The interactions of basis functions crossing a partition boundary, labeled boundary elements, are computed separately for each of the halves. That means that no interactions exist between basis function halves that are defined in separate ones of foe partitions 21. Those basis functions completely within a partition 21, labeled interior elements, interact only with other interior elements and boundary element halves in the same partition 21. In this way, interactions in the preconditioning matrix K between interior elements in the same partition 21 are equivalent to the interactions in the original matrix A, interactions between boundary elements and interior/boundary elements in the same partition(s) are different than the corresponding interactions in A. This is true due to neglecting some of the coupling between basis functions, and assuming that interactions between elements in different partitions are zero.

It is important to note that, unlike zeroing out interactions based on geometric radius, as discussed previously, the resulting preconditioning matrix is a valid solution to the original physical set of equations. More specifically, it is the superposition of several solutions, one for each region. In this; way it is ideally suited for preconditioning the matrix of the original system.

In accordance with the foregoing technique, the indices of the basis functions in the matrices A and K are sorted so that all internal elements appear first, grouped according to their respective regions, followed by all boundary elements. The resulting preconditioning matrix K for a geometry with n partitions 21 is computed in block 50 and is of the form:

$$K = \begin{bmatrix} [Ka_1] & & & & \\ & [Ka_2] & & & \\ & & \ddots & & [Kb] \\ & & & [Ka_n] & \\ [Kc] & & & & [Kd] \end{bmatrix}, \quad (1)$$

where the sub matrix Ka is the block diagonal matrix created by the union of the matrices of internal element interactions $Ka_1$ through $Ka_n$, Kd represents the interactions between the boundary elements, and Kb and Kc are the interactions between the internal and boundary elements. In general, Kb and Kc are not square, and are sparse since each column/row contains interactions between one boundary element and the internal elements to the two regions sharing that boundary. The matrix Kd is square, with dimension equal to the total number of boundary elements, and is sparse, although its complete LU factorization will in general be dense.

In order to solve the system of equations Ax=f implied by the mesh generator 20, the linear system matrix A from block 30, a vector f of the boundary conditions on each element from block 60, and the preconditioner function K from block 50 are combined in an iterative solver 70. The resulting output of the iterative solver 70 is the approximate solution x 80. The operation of the iterative solver 70, for example CG, with the preconditioner function K proceeds as follows:

A trial solution $x_o$ is selected. Vectors $r_o$ and $P_o$ are defined as $r_o = f - Ax_o$ and $P_o = K^{-1} r_o$. The following steps are then performed iteratively until convergence is achieved:

$$\alpha_i = (K^{-1} r_{i-1}, r_{i-1})/(p_{i-1}, A p_{i-1})$$

$$x_1 = x_{i-1} + \alpha_i p_{i-1}$$

$$r_i = r_{i-1} - \alpha_i A p_{i-1}$$

$$\beta_i = (K^{-1} r_i, r_i)/(K^{-1} r_{i-1}, r_{i-1})$$

$$p_i = K^{-1} r_i + \beta_i p_{i-1}$$

where the expression in the form of (x,y) represents the scalar product of the vectors x and y.

The application of the preconditioner function K requires the product $w = K^{-1} v$, where v and w are vectors. Since the inverse $K^{-1}$ would have a larger ratio of nonzero elements then K, this is performed by solving the system Kw=v. This is done by noting the division of K, w, and v into their internal and boundary elements:

$$\begin{bmatrix} v_{int} \\ v_{bnd} \end{bmatrix} = \begin{bmatrix} Ka & Kb \\ Kc & Kd \end{bmatrix} \begin{bmatrix} w_{int} \\ w_{bnd} \end{bmatrix}. \quad (2)$$

Using linear algebra operations, the solution for the boundary elements $w_{bnd}$ can be expressed as the solution of $$[Kd - KcKa^{-1} Kb] w_{bnd} = v_{bnd} - KcKa^{-1} v_{int}. \quad (3)$$

This requires only the LU factorization of the block diagonal matrix Ka and the factorization of the matrix [Kd−KcKa$^{-1}$Kb], which is of dimension equal to the total number of boundary elements and is typically extremely small compared to the total number of current elements. The solution of the internal elements $w_{int}$ is then $$w_{int} = Ka^{-1} v_{int} - Ka^{-1} Kb w_{bnd}. \quad (4)$$

The solution time for this linear system is dominated by the LU factorization of the block diagonal matrix Ka, and assuming a constant number of unknowns per partition for simplicity, is $O(N_{partions} N^3_{element\_per\_partition})$. Additionally, if the number of unknowns per partition is held fixed, and the size of the problem is increased, thus increasing the number of partitions, then the CPU time and storage requirements grow as O(N), even for an originally dense matrix A.

To perform as much upfront computation as possible before starting the CG, the LU factorizations of Ka and [Kd−KcKa$^{-1}$Kb] are preferably taken prior to starting the iterations. The traditional back substitution at each iteration is replaced with a combination of the back substitutions of the stored LU factorization of Ka, which is done as independent back substitutions on each block of Ka for maximum efficiency, two matrix-vector multiplications with the sparse matrixes Kb and Kc, and a back substitution on the matrix [Kd−KcKa$^{-1}$Kb], which is dense but small in dimension. The time spent preconditioning the system is dominated by the back substitutions, but the required CPU time is O(N).

Based on the foregoing description it can be appreciated that the preconditioner 50 partitions the description of the physical structure or entity, actually the mesh representation of the physical structure or entity, into isolated regions. Coupling between the regions or partitions exists only in the form of basis functions which cross the partition boundaries. The result is a preconditioner function K that is a superposition of smaller, valid solutions of the original set of governing equations. For this reason, it is applicable to linear systems with extremely poor condition numbers (>10$^{11}$). The storage requirements of the preconditioner 50 are sparse, and require but O(N) operations (O) per iteration to apply, where N is the dimension of the original linear system.

Discussed now is an application of the foregoing teachings to a specific, non-limiting class of problems, where the preconditioner 50 allows full wave linear systems of both electrically small and large geometries, with rooftop or RWG basis functions, to be properly preconditioned.

As was discussed above, the preconditioner 50 is based on the reduced coupling structure concept, the details of which can be found in "Electrical modeling of extremely large packages" by B. Rubin et al., in the Proceedings of the Electronic Components and Technology Conference 1997.

As was also discussed above, the original structure is partitioned into at least two smaller structures, as shown in FIG. 2. Assume for this case that the original structure represents a signal line embodied as a thick conductive loop 23. It is assumed that full electromagnetic coupling exists between electric and magnetic currents within each partition 21, and that the electric and magnetic currents do not couple with other currents outside of their respective partition 21. Current flow is enforced to be continuous across the boundaries of all partitions 21. The matrix for the linear system that results from this analysis of the partitioned structure, labeled as the reduced coupling system matrix, is the preconditioner for the original structure. The preconditioner and the necessary LU factorizations are sparse, so that the storage requirements are small and the application is fast.

Linear systems to be preconditioned may include the system of the original structure, such as the thick conductive loop 23, or a reduced coupling system composed of larger partitions than the preconditioner. Although the preconditioner removes the requirement of loop-tree or loop-star basis functions, it could also be applied to condition linear systems composed from these basis functions as well.

The generation of the partitions 21 could be automated, as shown in FIG. 1 at block 40. A simple example of automated partitions is to divide the structure into sections along each of the three coordinate axis, generating a grid of boxes that partition the structure.

In accordance with this invention the original structure is partitioned into at least two smaller structures, and those mesh cells that cross a partition boundary are split so that they start and stop on the partition boundary. In this way all mesh cells are located completely within one partition 21. A basic strategy for implementing the reduced coupling is to compute the basis/testing function (also known as an expansion/weighting function) interactions by treating each 'half' of the basis and testing functions independently. Here a 'half' denotes the function over one of its two mesh cells.

Each half basis is assumed to radiate electric/magnetic field only within the same partition, and thus interacts only with half testing functions within the same partition. Testing functions crossing a partition boundary, labeled boundary elements, are tested separately for the two halves. The half of the testing function in each partition tests only the field from basis functions in that partition. If the basis function in question is a boundary element, then only the half of the basis in that partition is tested. This also applies to the self terms, or diagonal terms, of the matrix. Testing functions located completely within a partition, labeled interior elements, operate to test the electric field from other interior elements and halves of boundary elements in the same partition. By forcing both halves of a boundary element to share the same coefficient in the linear system solution, the conduction current is continuous across boundaries if the partitions 21.

Figure 3:
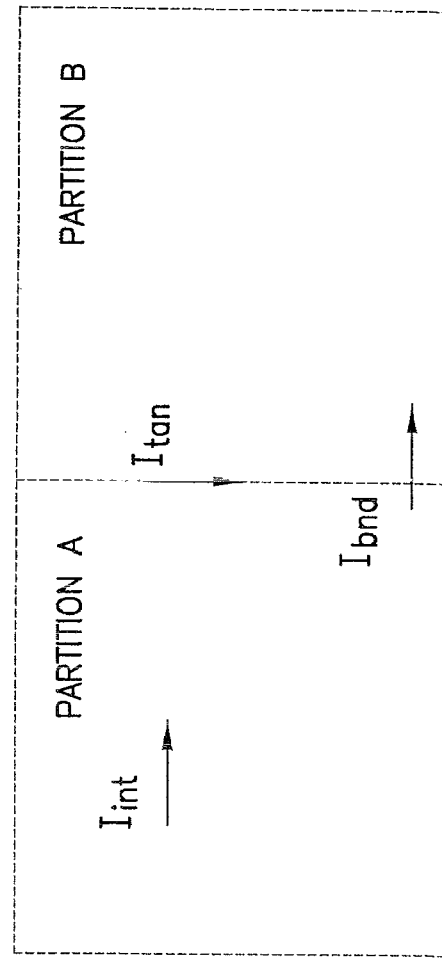
FIG. 3 illustrates two reduced coupling partitions having a partition boundary and shows, for a non-limiting example of an application of this invention, three types of currents (interior, across a boundary and along the boundary).

To illustrate the foregoing principles, FIG. 3 shows two partitions A and B for which the electric and/or magnetic current is the solution desired, labeled current elements, that exist within the partitions. The example current elements $I_{int}$, $I_{bnd}$ and $I_{tan}$ (I internal, boundary and tangent, functions.

The type of current is defined by the location relative to the partition boundaries. The current element $I_{bnd}$ represents a basis/testing function whose functional support crosses the boundary between the two partitions labeled A and B. When formulating the linear system matrix, the half of $I_{bnd}$ within partition A is tested over all of the testing function completely contained within partition A, and any halves of the testing functions from other boundary elements within A. The half of $I_{bnd}$ within partition B does not radiate into A, and thus its contribution is not tested within partition A. The reverse applies to the half of $I_{bnd}$ within partition B. Even the self term, or diagonal element, of the matrix does not contain interactions between the two halves of $I_{bnd}$. Both halves of the boundary element are given the same coefficient in the linear system solution, thus current is forced to be continuous across the boundary between the partitions A and B The current element $I_{int}$ represents a basis function whose support is complete contained within a single partition 21. The current $I_{int}$ is tested over all testing functions located completely within the same partition, as well as the halves of the boundary elements within the partition. All other interactions with $I_{int}$ are zero.

The current element $I_{tan}$ represents a basis/testing function whose support lies directly on, and does not cross, a partition boundary. The partition to which $I_{tan}$ belongs is thus undefined. In this case $I_{tan}$ is either assumed to be an internal element to one of the two partitions, or duplicated to produce two internal current elements, each internal to one of the two partitions that snare the boundary. Duplication appears to provide superior performance. If only half of the basis/testing function is tangent to the boundary, then the other half must be internal to one partition, and $I_{tan}$ is treated as in internal element to this partition only.

The indices of the basis/testing functions in the linear system are sorted so that all internal elements appear grouped according to their respective partitions, and boundary elements are grouped. The resulting linear system matrix for a geometry of n partitions then takes the form shown above in Eq. (1), the use of the preconditioner 50 proceeds as was discussed above.

It should be noted that there are at least two issues that are not obvious in the above-cited Rubin et al. publication that are believed to inhibit the disclosed technique from being most effectively used as a preconditioner. The first is that the diagonal elements of the matrix corresponding to the boundary elements are different in the reduced coupling system and in the original linear system. This is not the case for other preconditioning schemes, and would not be intuitive when implementing a preconditioner. The reason for this difference, as mentioned above, is that, unlike internal elements, the two halves of the boundary element do not couple with each other since they are located in separate partitions. If this detail is ignored, the reduced coupling preconditioner will be less effective.

The second issue relates to the fact that only those current elements that cross a partition boundary can be treated as boundary elements. While it might intuitively appear that the more coupling that is included in the preconditioner the better, this is not true in this case. Treating elements that are otherwise internal to a partition as boundary elements, by allowing them to couple to more than one partition, will result in a preconditioner that is less effective. Basically, the structure of the coupling as described above should be adhered to, or the preconditioner will be less effective.

The foregoing description has provided by way of exemplary and non-limiting embodiments a full and informative description of the best method and apparatus presently contemplated by the inventors for carrying out the invention based on the current knowledge of the inventors. However, various modifications and adaptations may become apparent to those skilled in the relevant arts in view of the foregoing description, when read in conjunction with the accompanying drawings and the appended claims. As but some examples, the use of other similar or equivalent iterative solvers 70, the use of sparse storage methods on the components of the preconditioner, the use of alternate mesh elements or expansion/interpolation functions, considering the elements of any two adjacent or nonadjacent partitions to belong to a single larger partition, and the use of this invention for other applications (other than to solve current flow in electrical conductors) may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A digital processing system operable to determine information indicative of at least one property of a physical entity by utilizing a linear system of equations to represent the physical entity, the digital processing system comprising:
   a generator configured to output a mesh representation of the physical entity, the mesh representation comprises a plurality of mesh elements;
   a first computation function configured to compute a linear system matrix A of coefficients by computing interactions between simple functions defined over sets of mesh elements;
   a partitioner configured to partition the mesh representation into a plurality of partitions separated by partition boundaries, wherein each partition comprises at least one mesh element of the plurality of mesh elements, wherein at least one partition comprises at least two mesh elements of the plurality of mesh elements;
   a second computation function configured to compute, using at least the plurality of partitions, a preconditioner for the linear system matrix A, wherein the preconditioner is compatible with the linear system of equations and provides at least basis function support over at least two mesh elements, where coupling of the preconditioner between partitions is only through basis functions at the partition boundaries;
   a solver configured to determine, using at least the linear system matrix A and the preconditioner, an approximate numerical solution of the linear system of equations, wherein the approximate numerical solution comprises the information indicative of at least one property of the physical entity, wherein the at least one property comprises a fluid mechanical property; and
   an output configured to return the approximate numerical solution.

2. A digital processing system as in claim 1, where the computed preconditioner is itself a valid solution to a same set of physical equations that govern the full linear system of equations.

3. A digital processing system as in claim 1, where said second computation function operates to compute a preconditioning matrix K where partition boundaries are constrained to coincide with the edges of mesh elements, and to determine mesh element interactions using reduced coupling.

4. A digital processing system as in claim 3, where said second computation function computes mesh element interactions between basis functions only for half functions within the same partition, where a half function denotes the function over any one of multiple mesh elements for which it is defined, and where the interactions of basis functions crossing a partition boundary are computed separately for each of the half functions such that no interactions exist between basis function halves that are defined in separate ones of the partitions, and those basis functions completely within a partition, referred to as interior elements, interact only with other interior elements and with boundary element halves within the same partition.

5. A digital processing system as in claim 4, where said second computation function operates to sort indices of basis functions in the matrices A and K so that all internal elements appear first, grouped according to their respective partitions, followed by all boundary elements, and where a resulting preconditioning matrix K for n partitions has the form:

$$K = \begin{bmatrix} [Ka_1] & & & & \\ & [Ka_2] & & & \\ & & \ddots & & [Kb] \\ & & & [Ka_n] & \\ [Kc] & & & & [Kd] \end{bmatrix},$$

where the sub matrix Ka is the block diagonal matrix created by the union of the matrices of internal element interactions $Ka_1$ through $Ka_n$, Kd represents the interactions between the boundary elements, and Kb and Kc are the interactions between the internal and boundary elements.

6. A digital processing system as in claim 5, wherein the solver further comprises an iterative solver operable to solve a system of equations $Ax = f$ using the linear system matrix A, a vector $f$ of boundary conditions on each mesh element and the preconditioner matrix K to provide an approximate solution x.

7. A digital processing system operable to determine information indicative of at least one property of a physical entity by utilizing a linear system of equations to represent the physical entity, the digital processing system comprising:
   a generator configured to output a mesh representation of the physical entity, the mesh representation comprises a plurality of mesh elements;
   a first computation function configured to compute a linear system matrix A of coefficients by computing interactions between simple functions defined over sets of mesh elements;
   a partitioner configured to partition the mesh representation into a plurality of partitions separated by partition boundaries, wherein each partition comprises at least one mesh element of the plurality of mesh elements, wherein at least one partition comprises at least two mesh elements of the plurality of mesh elements;
   a second computation function configured to compute, using at least the plurality of partitions, a preconditioner for the linear system matrix A, wherein the preconditioner is compatible with the linear system of equations and provides at least basis function support over at least two mesh elements, where coupling of the preconditioner between partitions is only through basis functions at the partition boundaries;
   a solver configured to determine, using at least the linear system matrix A and the preconditioner, an approximate numerical solution of the linear system of equations, wherein the approximate numerical solution comprises the information indicative of at least one property of the physical entity, wherein the at least one property comprises an acoustical property; and
   an output configured to return the approximate numerical solution.

8. A digital processing system as in claim 7, where the computed preconditioner is itself a valid solution to a same set of physical equations that govern the full linear system of equations.

9. A digital processing system as in claim 7, where said second computation function operates to compute a preconditioning matrix K where partition boundaries are constrained to coincide with the edges of mesh elements, and to determine mesh element interactions using reduced coupling.

10. A digital processing system as in claim 9, where said second computation function computes mesh element interactions between basis functions only for half functions within the same partition, where a half function denotes the function over any one of multiple mesh elements for which it is defined, and where the interactions of basis functions crossing a partition boundary are computed separately for each of the half functions such that no interactions exist between basis function halves that are defined in separate ones of the partitions, and those basis functions completely within a partition, referred to as interior elements, interact only with other interior elements and with boundary element halves within the same partition.

11. A digital processing system as in claim 10, where said second computation function operates to sort indices of basis functions in the matrices A and K so that all internal elements appear first, grouped according to their respective partitions, followed by all boundary elements, and where a resulting preconditioning matrix K for n partitions has the form:

$$K = \begin{bmatrix} [Ka_1] & & & & \\ & [Ka_2] & & & \\ & & \ddots & & [Kb] \\ & & & [Ka_n] & \\ [Kc] & & & & [Kd] \end{bmatrix},$$

where the sub matrix Ka is the block diagonal matrix created by the union of the matrices of internal element interactions $Ka_1$ through $Ka_n$, Kd represents the interactions between the boundary elements, and Kb and Kc are the interactions between the internal and boundary elements.

12. A digital processing system as in claim 11, wherein the solver further comprises an iterative solver operable to solve a system of equations $Ax=f$ using the linear system matrix A, a vector $f$ of boundary conditions on each mesh element and the preconditioner matrix K to provide an approximate solution x.

13. A digital processing system operable to determine information indicative of at least one property of a physical entity by utilizing a linear system of equations to represent the physical entity, the digital processing system comprising:
- a generator configured to output a mesh representation of the physical entity, the mesh representation comprises a plurality of mesh elements;
- a first computation function configured to compute a linear system matrix A of coefficients by computing interactions between simple functions defined over sets of mesh elements;
- a partitioner configured to partition the mesh representation into a plurality of partitions separated by partition boundaries, wherein each partition comprises at least one mesh element of the plurality of mesh elements, wherein at least one partition comprises at least two mesh elements of the plurality of mesh elements;
- a second computation function configured to compute, using at least the plurality of partitions, a preconditioner for the linear system matrix A, wherein the preconditioner is compatible with the linear system of equations and provides at least basis function support over at least two mesh elements, where coupling of the preconditioner between partitions is only through basis functions at the partition boundaries;
- a solver configured to determine, using at least the linear system matrix A and the preconditioner, an approximate numerical solution of the linear system of equations, wherein the approximate numerical solution comprises the information indicative of at least one property of the physical entity, wherein the at least one property comprises a field scattering property; and
- an output configured to return the approximate numerical solution.

14. A digital processing system as in claim 13, where the computed preconditioner is itself a valid solution to a same set of physical equations that govern the full linear system of equations.

15. A digital processing system as in claim 13, where said second computation function operates to compute a preconditioning matrix K where partition boundaries are constrained to coincide with the edges of mesh elements, and to determine mesh element interactions using reduced coupling.

16. A digital processing system as in claim 15, where said second computation function computes mesh element interactions between basis functions only for half functions within the same partition, where a half function denotes the function over any one of multiple mesh elements for which it is defined, and where the interactions of basis functions crossing a partition boundary are computed separately for each of the half functions such that no interactions exist between basis function halves that are defined in separate ones of the partitions, and those basis functions completely within a partition, referred to as interior elements, interact only with other interior elements and with boundary element halves within the same partition.

17. A digital processing system as in claim 16, where said second computation function operates to sort indices of basis functions in the matrices A and K so that all internal elements appear first, grouped according to their respective partitions, followed by all boundary elements, and where a resulting preconditioning matrix K for n partitions has the form:

$$K = \begin{bmatrix} [Ka_1] & & & & \\ & [Ka_2] & & & \\ & & \ddots & & [Kb] \\ & & & [Ka_n] & \\ [Kc] & & & & [Kd] \end{bmatrix},$$

where the sub matrix Ka is the block diagonal matrix created by the union of the matrices of internal element interactions $Ka_1$ through $Ka_n$, Kd represents the interactions between the boundary elements, and Kb and Kc are the interactions between the internal and boundary elements.

18. A digital processing system as in claim 17, wherein the solver further comprises an iterative solver operable to solve a system of equations $Ax=f$ using the linear system matrix A, a vector of boundary conditions on each mesh element and the preconditioner matrix K to provide an approximate solution x.

19. A digital processing system operable to determine information indicative of at least one property of a physical entity by utilizing a linear system of equations to represent the physical entity, the digital processing system comprising:
- a generator configured to output a mesh representation of the physical entity, the mesh representation comprises a plurality of mesh elements;
- a first computation function configured to compute a linear system matrix A of coefficients by computing interactions between simple functions defined over sets of mesh elements;
- a partitioner configured to partition the mesh representation into a plurality of partitions separated by partition boundaries, wherein each partition comprises at least one mesh element of the plurality of mesh elements, wherein at least one partition comprises at least two mesh elements of the plurality of mesh elements;

a second computation function configured to compute, using at least the plurality of partitions, a preconditioner for the linear system matrix A, wherein the preconditioner is compatible with the linear system of equations and provides at least basis function support over at least two mesh elements, where coupling of the preconditioner between partitions is only through basis functions at the partition boundaries;

a solver configured to determine, using at least the linear system matrix A and the preconditioner, an approximate numerical solution of the linear system of equations, wherein the approximate numerical solution comprises the information indicative of at least one property of the physical entity, wherein the at least one property comprises an electromagnetic property of a printed circuit board; and an output configured to return the approximate numerical solution.

20. A digital processing system as in claim 19, where the computed preconditioner is itself a valid solution to a same set of physical equations that govern the full linear system of equations.

21. A digital processing system as in claim 19, where said second computation function operates to compute a preconditioning matrix K where partition boundaries are constrained to coincide with the edges of mesh elements, and to determine mesh element interactions using reduced coupling.

22. A digital processing system as in claim 21, where said second computation function computes mesh element interactions between basis functions only for half functions within the same partition, where a half function denotes the function over any one of multiple mesh elements for which it is defined, and where the interactions of basis functions crossing a partition boundary are computed separately for each of the half functions such that no interactions exist between basis function halves that are defined in separate ones of the partitions, and those basis functions completely within a partition, referred to as interior elements, interact only with other interior elements and with boundary element halves within the same partition.

23. A digital processing system as in claim 22, where said second computation function operates to sort indices of basis functions in the matrices A and K so that all internal elements appear first, grouped according to their respective partitions, followed by all boundary elements, and where a resulting preconditioning matrix K for n partitions has the form:

$$K = \begin{bmatrix} [Ka_1] & & & & \\ & [Ka_2] & & & \\ & & \ddots & & [Kb] \\ & & & [Ka_n] & \\ [Kc] & & & & [Kd] \end{bmatrix},$$

where the sub matrix Ka is the block diagonal matrix created by the union of the matrices of internal element interactions $Ka_1$ through $Ka_n$, Kd represents the interactions between the boundary elements, and Kb and Kc are the interactions between the internal and boundary elements.

24. A digital processing system as in claim 23, wherein the solver further comprises an iterative solver operable to solve a system of equations Ax=ƒ using the linear system matrix A, a vector ƒ of boundary conditions on each mesh element and the preconditioner matrix K to provide an approximate solution x.

* * * * *